United States Patent [19]
Yamagami et al.

[11] Patent Number: 5,469,416
[45] Date of Patent: Nov. 21, 1995

[54] APPARATUS FOR REPRODUCING RECORDED DATA AND SELECTIVELY EITHER OF READ-ONLY OR RECORDED SYNCHRONIZATION INFORMATION FROM A MAGNETO-OPTICAL RECORDING MEDIUM

[75] Inventors: Tamotsu Yamagami, Kanagawa; Yoichiro Sako, Chiba; Masanobu Yamamoto, Kanagawa, all of Japan

[73] Assignee: Sony Corporation, Tokyo, Japan

[21] Appl. No.: 190,887

[22] Filed: Feb. 3, 1994

Related U.S. Application Data

[63] Continuation of Ser. No. 22,561, Feb. 25, 1993, which is a continuation of Ser. No. 689,057, filed as PCT/JP90/01072, Aug. 22, 1990.

[30] Foreign Application Priority Data

Aug. 25, 1989 [JP] Japan ............................ 1-219413
Aug. 31, 1989 [JP] Japan ............................ 1-225314
Aug. 31, 1989 [JP] Japan ............................ 1-225315

[51] Int. Cl.$^6$ ........................................ G11B 5/09
[52] U.S. Cl. .................................. 369/48; 369/50
[58] Field of Search .................... 369/13, 32, 48, 369/59, 44.13, 44.38, 111, 109, 275.1, 275.3, 275.5, 50, 58, 47; 360/40

[56] References Cited

U.S. PATENT DOCUMENTS

| | | | |
|---|---|---|---|
| 4,375,088 | 2/1983 | De Haan et al. | 365/48 |
| 4,464,714 | 8/1984 | Huijser et al. | 364/200 |
| 4,967,403 | 10/1990 | Ogawa et al. | 369/275.3 |
| 5,060,208 | 10/1991 | Nagai et al. | 369/13 |
| 5,077,721 | 12/1991 | Sako et al. | 369/32 |
| 5,185,732 | 2/1993 | Ogawa et al. | 369/275.3 |

FOREIGN PATENT DOCUMENTS

| | | | |
|---|---|---|---|
| 0032271A1 | 7/1981 | European Pat. Off. | G11B 7/00 |
| 0299573 | 1/1989 | European Pat. Off. | |
| 0325330A1 | 7/1989 | European Pat. Off. | G11B 27/30 |
| 0326206A1 | 8/1989 | European Pat. Off. | G11B 27/30 |
| 0414557A2 | 2/1991 | European Pat. Off. | G11B 7/00 |
| 0414518A2 | 2/1991 | European Pat. Off. | G11B 20/12 |
| 0158045 | 7/1986 | Japan | 369/275.1 |
| 0236046 | 10/1986 | Japan | |
| 0043839 | 2/1987 | Japan | 369/275.1 |
| 0078729 | 4/1987 | Japan | 369/275.1 |
| 0032751 | 2/1988 | Japan | 369/275.3 |
| 2022875 | 12/1979 | United Kingdom | G11B 7/00 |
| 2067313 | 7/1981 | United Kingdom | G11B 7/08 |

*Primary Examiner*—Georgia Y. Epps
*Assistant Examiner*—P. W. Huber
*Attorney, Agent, or Firm*—Limbach & Limbach; W. Patrick Bengtsson

[57] ABSTRACT

In an optical recording medium on which the main information is recorded on a pre-formed recording track along the track direction and in which the recorded data are read out by opticaL means, frame sync signals based on the same format as the format for the main information are pre-recorded by offsetting the recording track itself along its width for each frame as an information recording unit, for facilitating frame synchronization and simplifying the construction through the use of a sole common synchronizing circuit. The information pre-recorded by offsetting the track itself along its width includes not only the frame sync signals but also any reproduce-only information for increasing the disc recording capacity. The reproducing circuit for reproducing the frame sync signals of the main information recorded along the track direction of the recording track, and the reproducing circuit for reproducing the frame sync signals having the same format as the main information among the information recorded by offsetting the track along its width, are formed as a common circuit for simplifying the circuit construction.

7 Claims, 8 Drawing Sheets

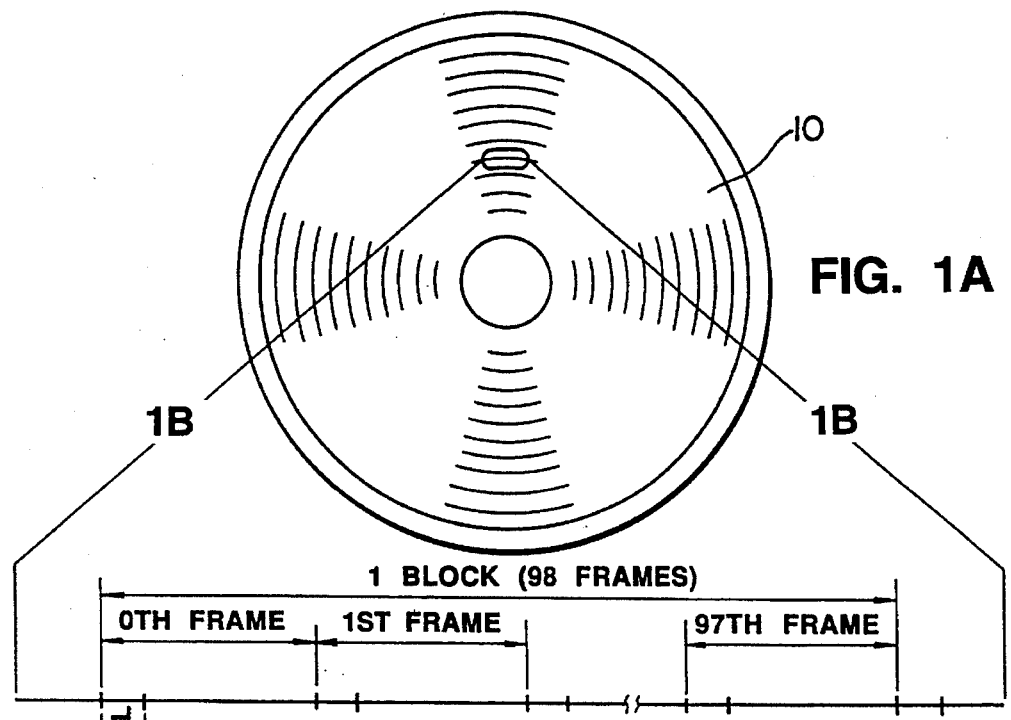
FIG. 1A
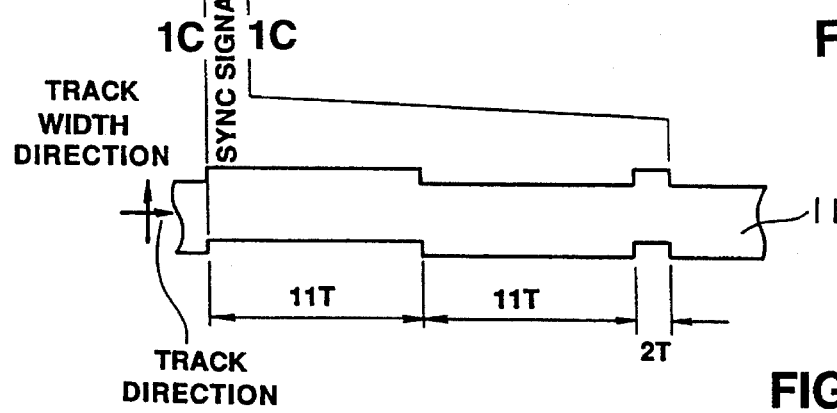
FIG. 1B
FIG. 1C

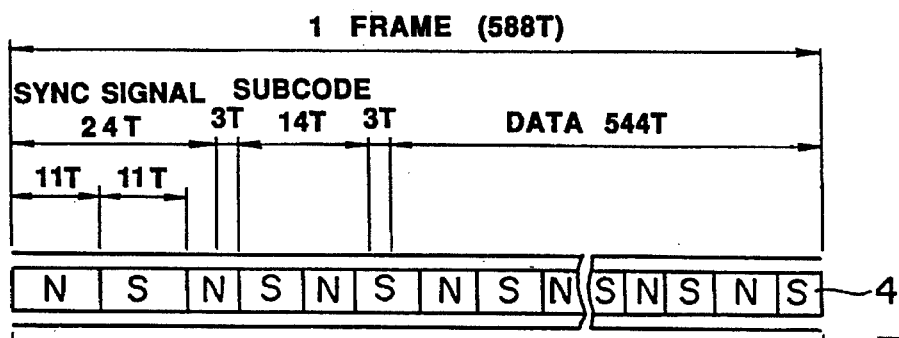
FIG. 8B
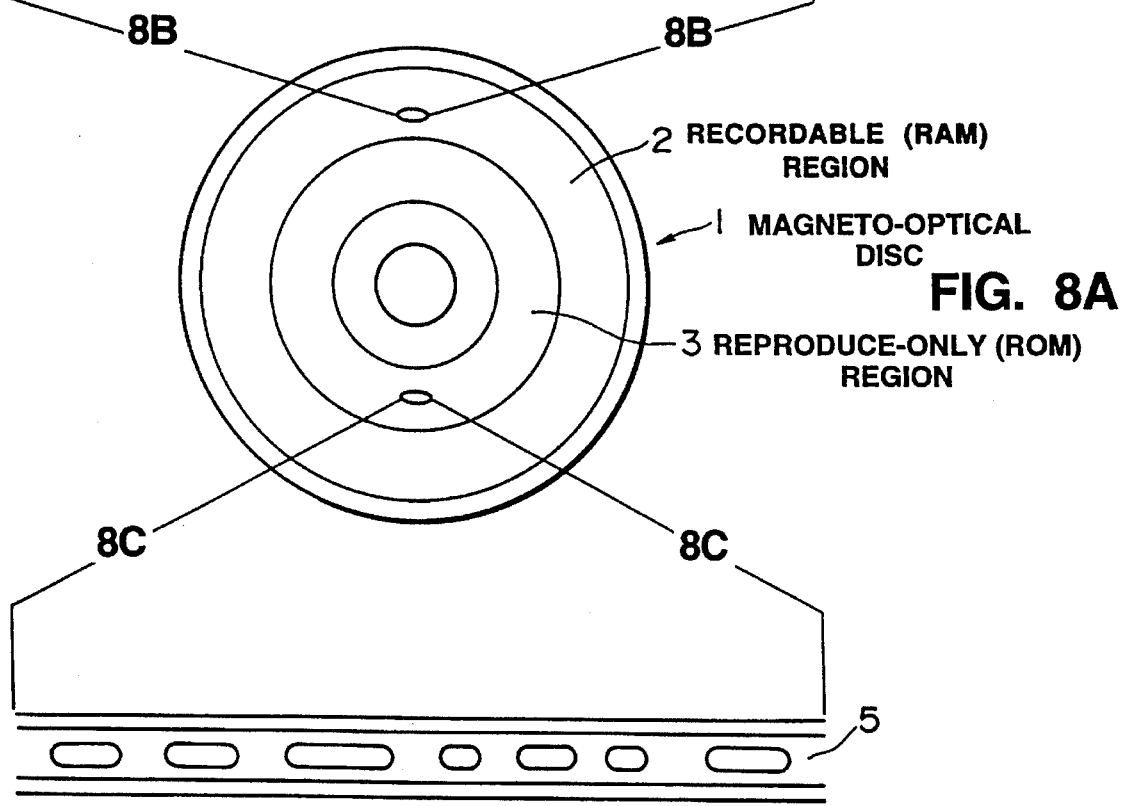
FIG. 8A
FIG. 8C

APPARATUS FOR REPRODUCING RECORDED DATA AND SELECTIVELY EITHER OF READ-ONLY OR RECORDED SYNCHRONIZATION INFORMATION FROM A MAGNETO-OPTICAL RECORDING MEDIUM

This is a continuation application of pending prior application Ser. No. 08/022,561 filed on Feb. 25, 1993, of TAMOTSU YAMAGAMI ET AL. for A METHOD FOR REPRODUCING INFORMATION RECORDED ON AN OPTICAL RECORDING MEDIUM HAVING A PRE-FORMED RECORDING TRACK WHICH IS OFFSET ALONG ITS WIDTH TO RECORD FRAME SYNC SIGNALS OF THE INFORMATION RECORDED ON THE MEDIUM, which is a continuation of pending prior application Ser. No. 07/689,057, filed as PCT/JP90/01072, Aug. 22, 1990, of TAMOTSU YAMGAMI ET AL. for OPTICAL RECORDING MEDIUM, METHOD FOR RECORDING INFORMATION AND METHOD FOR REPRODUCING INFORMATION.

This invention relates to an optical recording medium on a pre-formed recording track of which the reproduce-only information other than the main information recorded along the track direction is recorded by offsetting the track along its width, a method for recording the information on the optical recording medium, and a method for reproducing the information from the optical recording medium.

BACKGROUND ART

In an optical recording medium on which the information can be recorded, such as a magneto-optical disc, it has been known to provide a helical groove or concentric grooves for tracking in advance on the disc, with the inside of the pre-formed groove or pre-groove or the land between the adjoining pre-grooves being used as a recording track, and to record and/or reproduce the information photomagnetically on or from the recording track along the track direction. That is, the pre-groove is detected optically and the main information is recorded and/or reproduced along the direction of the recording track under application of tracking servo.

In this case, it has been known to record alternately the control information, such as sync signals or addresses, referred to sometimes in this specification as reproduce-only information, and the recording data information per se, on the recording track along the track direction, and to execute data supervision on the basis of the sync signals, addresses etc. of the control information. That is, synchronization of a frame or segment as a unit of data recording is taken by the sync signals, and data are recorded and/or reproduced on the frame-by-frame or sector-by-sector basis with the aid of the address information. As the format for these sync signals and addresses, a so-called CD (compact disc) format, for example, is used in view of interchangeability.

The conventional CD format is explained briefly by referring to FIG. 7.

In this figure, each block or sector as an information recording unit consists of 98 frames of from 0th to 97th frames. The period of each frame is 588 T, that is, 588 times the channel clock period T. Each frame is provided with recording regions for frame sync signals, subcode and data inclusive of parity data. A 24 T (24 channel bit) frame sync signals region and a 14 T subcode region are provided at the leading end of each frame and interconnected by 3 T connection bits. In the remaining 544 T region, there are arrayed 32 symbols or 32 bytes of sampled data and parity data modulated by the so-called eight-to-fourteen modulation (EFM) system. The frame sync signals include two successive 11 T transition intervals to provide an out-of-rule pattern not found in EFM. The 14 T subcode region corresponds to one 8-bit symbol.

If an uninitialized optical disc, that is an optical disc on which no data are written, is used, the disc needs to be formatted, that is, sync signals or address information necessary for recording and/or reproduction on or from the optical disc, need to be written along the track direction in the form of, for example, photomagnetic signals.

In the Japanese Patent KOKAI Publication No. 63-87682 (1988), there is disclosed a technique in which the timing code as the address information is included in wobbling signal components of a groove previously formed with wobbling along the track width for tracking (pregroove). For the wobbling signal, a signal which is obtained by frequency modulation of the sinusoidal carrier signal with a frequency of 22.05 kHz, with an absolute time code having a frequency sufficiently lower than that of the carrier signal, is employed. During groove formation on the disc, the groove is wobbled along the track width by the frequency modulated signal for forming the pre-groove in which the absolute time information is included in the wobbling signal. This is abbreviated to ATIP (absolute time in pregroove). During recording/reproduction of the recording data or main data, tracking error signals are obtained from the signals reproduced from the pregroove, while the absolute time codes are demodulated to produce the address information.

With such ATIP technique, detection or processing of signals recorded after frequency modulation is necessarily performed by a dedicated circuit, such that a conventional LSI (large scale integrated circuit) for CDs, for example, cannot be employed. That is, considering that a variety of integrated circuits (ICs) or LSIs, adapted to the pre-existing formats, such as the CD format, are currently presented to the market, it is more desirable that these pre-existing ICs or LSIs be utilizable from the viewpoint that the recording/reproducing apparatus may thereby be lowered in production costs. On the other hand, the information recordable by the ATIP technique is solely the timing code and, if desired to record general data, it becomes impossible to record the timing code, such that the optical pickup cannot be positioned precisely.

On the other hand, since it is convenient both for the user and for the producer supplying the software to the user if the reproduce-only data such as the operating system or basic dictionary are previously recorded on a medium, and such medium is supplied to the user as the above mentioned recordable optical recording medium, there has been proposed and developed a recording medium, such as a disc, on which data may be recorded and the reproduce-only information (ROM information are written previously.

FIG. 8 shows an example of a magneto-optical disc as a recording medium on which the reproduce-only data are recorded previously. In this figure, a magneto-optical disc 1 is provided with a RAM region 2 on which signals may be recorded and a ROM region 3 adapted to be reproduced exclusively. In the RAM region 2, the inside of the previously formed pre-groove or the land between adjacent grooves is reserved for the recording track 4, and the information is photomagnetically recorded on this recording track 4. In the ROM region 3, there is provided a track 5 in which reproduce-only data are previously recorded (preformatted) in the form of pits or the like.

With such a magneto-optical disc 1, since the recordable RAM region 2 and the reproduce-only ROM region 3 are separated from each other, the recordable capacity on the overall disc surface is diminished by an amount equal to the area of the ROM region 3.

On the other hand, control data such as sync signals or the address information for facilitating the accessing during recording/reproduction need to be included in the main information recorded in the RAM region 2. For example, in the case of a format in which frame synchronization is taken at each 588 T frame, T being a channel bit period, in accordance with the CD format (format for compact disc), a 24 T sync signal part having a pattern of two successive 11 T transition periods and a 14 T subcode part connecting to the sync signal part by 3 T connecting pits are provided at the leading end of each frame, as shown in FIG. 8, and the remaining 544 T data with the interposition of the 3 T connecting bits provide the data proper inclusive of parity bits. Thus the 44 T region of the 588 T region of each frame cannot be used for recording the data per se.

The present invention has been made in view of the foregoing. It is an object of the present invention to provide an optical recording medium and a method for data recording/reproducing wherein the IC or LSI adapted for a widely employed format, such as the pre-existing CD format, may be employed directly.

It is another object of the present invention to provide an optical recording medium and a method for information recording/reproduction, wherein the information recording capacity of the optical recording medium, on which reproduce-only data have been recorded in advance by offsetting along the track width, may be increased, the circuitry for recording/reproduction on or from the recording medium may be simplified and the pre-existing format may be utilized directly.

SUMMARY OF THE INVENTION

For accomplishing the above and other objects, the present invention provides a reproducing apparatus for an optical disc, the optical disc having a recordable area for recording main data on a previously formed recording track along a track length direction, the recording track having at least one offset portion, the offset portion being offset according to control data which is used to control the operation of the apparatus in the radial direction of the optical disc. The apparatus according to the invention includes an optical pickup including first and second photodetectors, the first photodetector receiving one of two light beams divided from a light beam reflected by the optical disc, the second photodetector receiving the other of the two light beams divided from the reflected light beam. A differential amplifier is supplied with output signals from the first photodetector and the second photodetector and outputs a signal representing the difference between the output signals of the first photodetector and the second photodetector. A first signal processing unit is supplied with one of the output signal from the first photodetector or the output signal from the differential amplifier and includes a sync reproducing circuit for capturing a sync signal from a detection signal of the offset portion of the recording track from the output signal of the first photodetector. A second signal processing unit is supplied the output signal from the differential amplifier and includes a signal detection circuit for reproducing from the output signal of the differential amplifier main information data recorded along a length direction of the recording track.

The apparatus according to a preferred embodiment of the invention further comprises a switch circuit controlled by an output signal from the sync reproducing circuit, the switch circuit selecting which of the output from the differential amplifier or the first photodetector is supplied to the first signal processing unit.

With the above described recording medium of the present invention, since the frame sync signals having the same format as that of the frame sync signals for the main information is pre-recorded thereon by offsetting the track along the track width, frame synchronization may be achieved by directly using the frame synchronization circuit for the main information.

Besides, with the method for recording the information according to the present invention, since the recording system for the reproduce-only information previously recorded by track offsetting along the track width is identified with the recording system for the main information, not only the reproducing circuit construction may be used in common, but also the reproducing circuit itself may be used in common. In addition since the recording system for the main information is identified with the pre-existing recording system, the pre-existing circuit may be utilized directly.

BRIEF DESCRIPTION OF THE DRAWINGS

FIG. 1 is a diagrammatic plan view of a magneto-optical disc according to a first embodiment of an optical recording medium of the present invention;

FIG. 8 is a diagrammatic plan view showing an example of a conventional disc having a region adapted to be reproduced exclusively.

BEST EMBODIMENTS FOR PRACTICING THE INVENTION

FIG. 1 shows diagrammatically an arrangement of a first embodiment of a recording medium according to the present invention. In this figure, a magneto-optical disc 10 in which a perpendicular magnetization film exhibiting magneto-optical effects, for example, is formed on a transparent substrate, is shown, while a part of the recording track is also shown diagrammatically to an enlarged scale.

In FIG. 1, a groove for tracking is formed on a magneto-optical disc 10 spirally or concentrically to form a so-called pre-groove. This pre-groove or the land between adjoining pre-grooves is used as a recording track 11 and the magneto-optical (MO) signals as main information are recorded on this recording track 11. In this track 11, frame sync signals, addresses and data are recorded alternately along the track direction in accordance with a predetermined format, for example, the so-called CD (compact disc) format. Frame synchronization is taken by the frame sync signals, while data are recorded and/or reproduced in accordance with the address information, with a frame (segment) or a sector as a unit.

The track 11 is offset along the track width by the frame sync signals which are the same as the frame sync signals of the format for the main information, for example, the above mentioned CD format. More specifically, as shown in FIG. 1, the frame sync signals are recorded as the offsets along the track width in accordance with a pattern not found in the EEM system (out-of-rule pattern), that is, a pattern in which an 11 T transition interval occurs twice in succession, T being a period of a channel clock in the CD format. The frame sync signals may be followed by the subsidiary information, such as address information, recorded by offsets along the track width.

Figure 2:
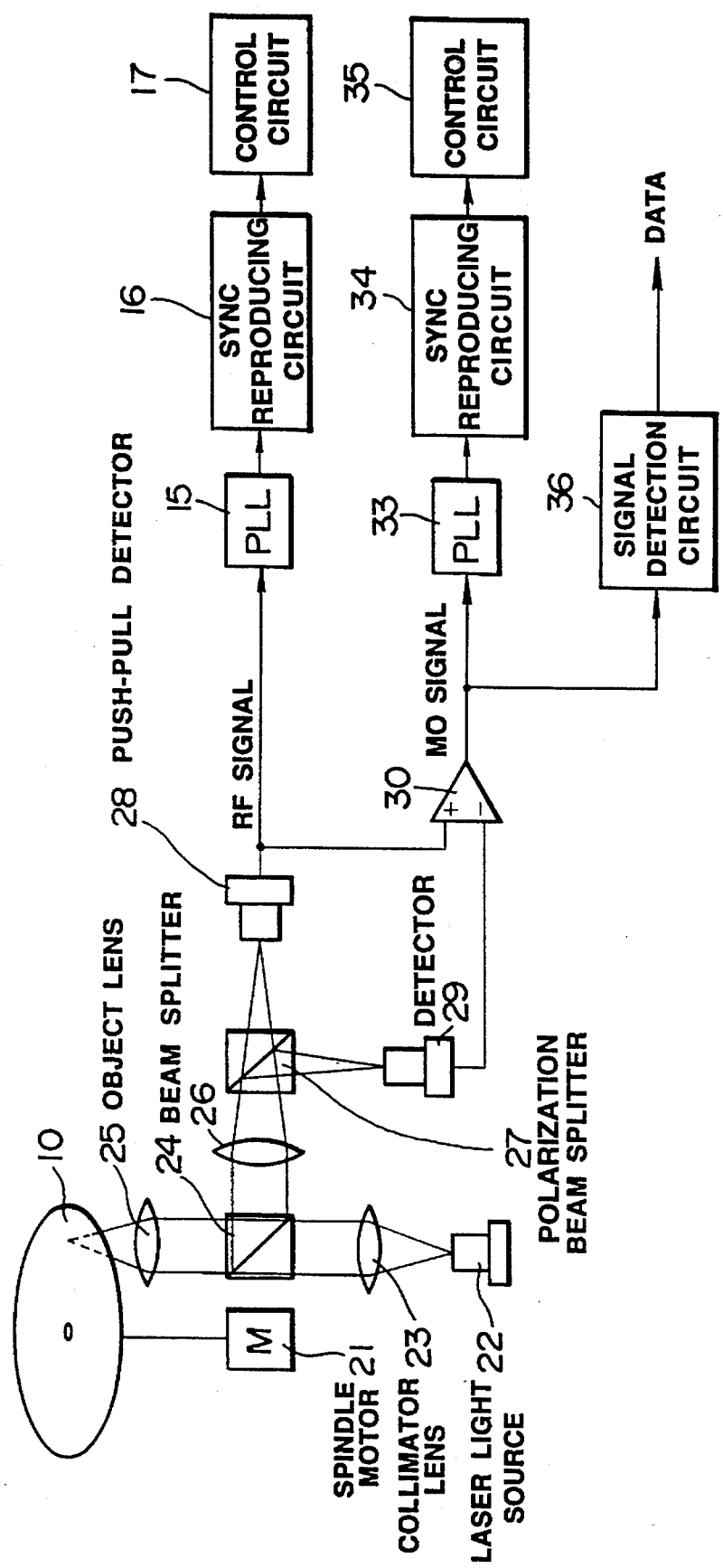
FIGS. 2 and 3 are block circuit diagrams showing different concrete examples of an information reproducing circuit for reproducing the information recorded on the magneto-optical disc shown in FIG. 1.

FIG. 2 shows an example of a signal reproducing apparatus adapted for reproducing signals from a magneto-optical disc, on which the frame sync signals, which are the same as the frame sync signals for main information on the track, are previously recorded by offsets along track width.

In this figure, a recording track 11, which is offset along the track width by frame sync signals, which are the same as frame signals for the main information, as shown in FIG. 1, is pre-recorded spirally or concentrically on the magneto-optical disc 10. The disc 10 is adapted to be driven rotationally by a spindle motor 21 at a constant linear velocity (CLV) or at a constant angular velocity (CAV). A laser beam for recording/reproduction from a laser light source 22, such as a laser diode, is collimated by a collimator lens 23 and irradiated on the magneto-optical disc 10 by means of a beam splitter 24 and a so-called biaxial object lens 25 for focusing and tracking. The reflected beam from the disc 10 is separated by beam splitter 24 and falls on a polarization beam splitter 27 by means of an optical system 26 constituted by a ½ wavelength plate, a converging lens, a cylindrical lens and so forth. The light is separated by the beam splitter 27 into so-called a P polarized light component and an S polarized light component so as to fall on photodetectors 28 and 29 adapted for detecting tracking error signals, focusing error signals and magneto-optical or MO signals.

The photodetector 28 has four-segment light-receiving sides, and is adapted for detecting the tracking error signals and the focusing error signals. The information signals recorded by the offsetting along the track width are obtained as the high frequency component of the tracking error signals. The output of the photodetector 28, referred to herein as a FATUI signal, is supplied to a position (+) input terminal of a differential amplifier 30, while the output of the photodetector 29 is supplied to a negative (−) input terminal of the differential amplifier 30, where the output of the detector 29 is subtracted from the output of the detector 28 to reproduce the magneto-optical signals (MO) signals.

The above mentioned FATUI signals are supplied to a FETA (phase locked loop) circuit 15, where clocks synchronized to the FATUI signals are reproduced. Then, in a sync reproducing circuit 16, frame sync or block sync capturing is performed on signals recording along the track width. That is, the out-of rule frame sync signal pattern not found in the EFM rule, as shown in FIG. 1, is detected for frame sync capturing and subsequent block sync capturing. Based on these sync signals, control operations, such as CLV control operation for maintaining the spindle motor 21 at a constant linear velocity or optical pickup seek operation for shifting the optical pickup to, for example, the target address, are performed by a control circuit 17.

The MO signals are supplied to a FETA 33 and a signal detection circuit 36. In this FETA 33, clocks synchronized with the MO signals are reproduced, as in the above mentioned FATUI reproducing system. Frame synchronization and block synchronization are then taken in a sync reproducing circuit 34. Control operations for spindle motor 21 or optical pickup seek operations are performed in a control circuit 35. The main information (recording data per se), recorded along the track direction on the recording track, are reproduced in a signal detection circuit 36.

Meanwhile, if the format of the frame sync signals recorded by offsetting along the track width is identified with the format of the frame sync signals for the main information, the FETA circuit 15, sync reproducing circuit 16 and the control circuit 17 of the FATUI signal system may be identified with the FETA circuit 3, sync reproducing circuit 34 and the control circuit 35 of the MO signal system, such that the LSIs or circuits employed in the FATUI signal system may be identified with the conventional LSIs or circuits employed in the MO signal system. In other words, if the format of the frame sync signals recorded by offsetting along the track width, is identified with that of, for example, the frame sync signals of the CD format, the LSIs, developed for CD formats and utilized extensively, may be used directly.

On the other hand, by using the frame sync signals, and the address information, recorded by offsetting along the track width, FETA sync capturing, controlling the spindle motor 21 to a CLV by control circuit 17, subcode decoding or seeking may be performed even with an uninitialized magneto-optical disc on the track of which the main information is not written.

The optical recording medium, such as a magneto-optical disc, on which the information such as the frame sync signals or addresses are pre-recorded by the offsetting of the recording track itself along its width, may be mass-produced by a press working step of the disc producing process with the use of a master disc, a stamper or the like.

Figure 3:
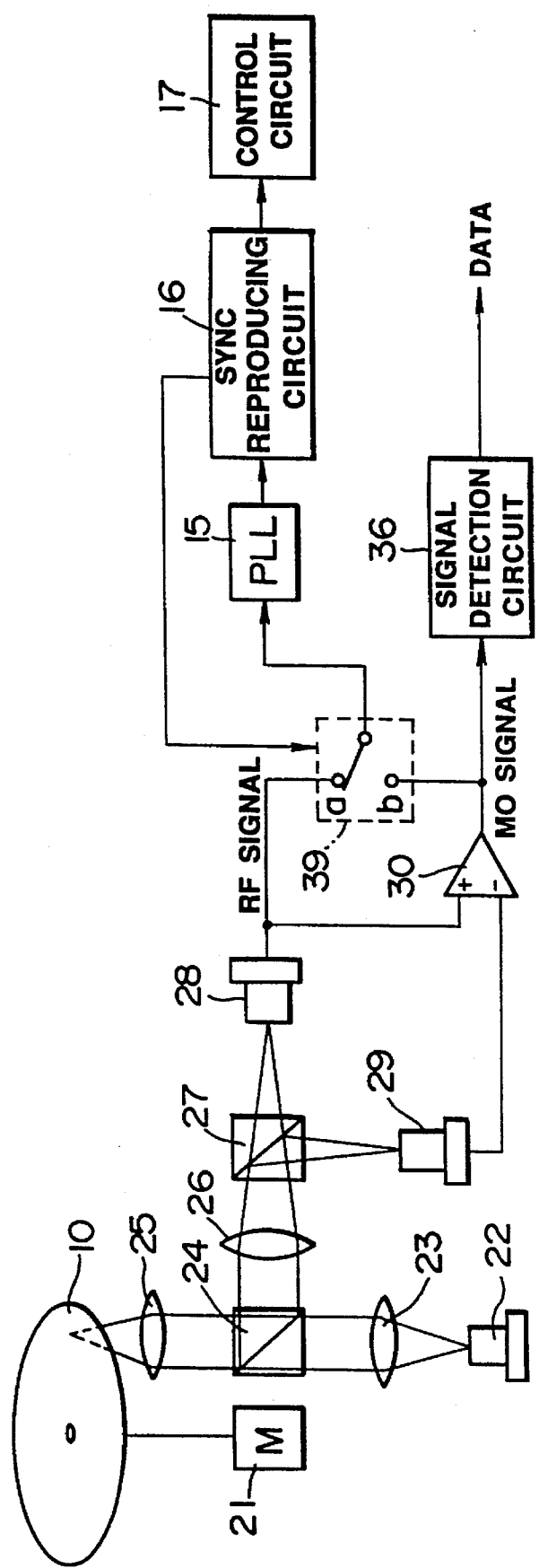

As an alternative to the example shown in FIG. 2, a switch 39 may be provided as shown in FIG. 3 so that the sync signal reproducing systems for the FATUI signal system and the MO signal system are combined into one circuit. In this case, the switch 39 may be selectively set to the side of a fixed contact a for the FATUI signal system or to the side of a fixed contact b for the MO signal system. Since the construction and operation are the same as that of the embodiment shown in FIG. 2, the corresponding parts or components are designated by the same reference numerals and the description is omitted for clarity.

As shown in FIG. 3, a reproducing apparatus for an optical disc 10, having a recordable area for recording main data on a previously formed recording track 11 along a track length direction, the recording track 11 having at least one portion being offset according to control data which is used to control the operation of the apparatus in the radial direction of the optical disc 10, includes an optical pickup 22–29 having first and second photodetectors 28, 29, respectively. The first photo detector 28 receives one of the two light beams divided (by beam splitter 27) from a light beam reflected by the optical disc 10. The second photodetector 29 receives the other of the two light beams divided from the reflected light beam.

A differential amplifier 30 is supplied with output signals from the first photo detector 28 and the second photodetector 29 and outputs an MO signal representing the difference between the output signals of the first photo detector 28 and the second photodetector 29. A first signal processing unit 15–17 is supplied with one of the output signal from the first photo detector 28 or the output signal from the differential amplifier 30 and includes a PLL circuit 15, a sync reproducing circuit 16 for capturing a sync signal from a detection signal of the offset portion 11 of the recording track 11 from the output signal of the first photo detector 28, and a control circuit 17. A second signal processing unit 36 is supplied with the output signal from the differential amplifier 30 and includes a signal detection circuit for reproducing from the output signal of the differential amplifier 30 main information data recorded along a length direction of the recorded track 11.

A switch circuit 39, controlled by an output signal from the sync reproducing circuit 16, selects which of the output from the differential amplifier 30 or the output from the first photo detector 28 is supplied to the first signal processing unit 15–17.

It will be seen from above that, with the recording medium of the present invention, with the format for the frame sync signals recorded by offsetting along the track width being of the same type as that of the frame sync signals for the main information recorded on the recording track, such as the CD format, the sync signal reproducing system for the recording data offset along the track width of the main information may be of the same construction. In addition, when an unrecorded disc on which main information recording is not made as yet by the user, is used, FETA sync capturing, spindle motor rotation control, subcode decoding or seeking may be achieved with the use of the pre-existing signal recording apparatus employing the LSIs or circuits for CD formatting.

Figures 4A, 4B, 4C:
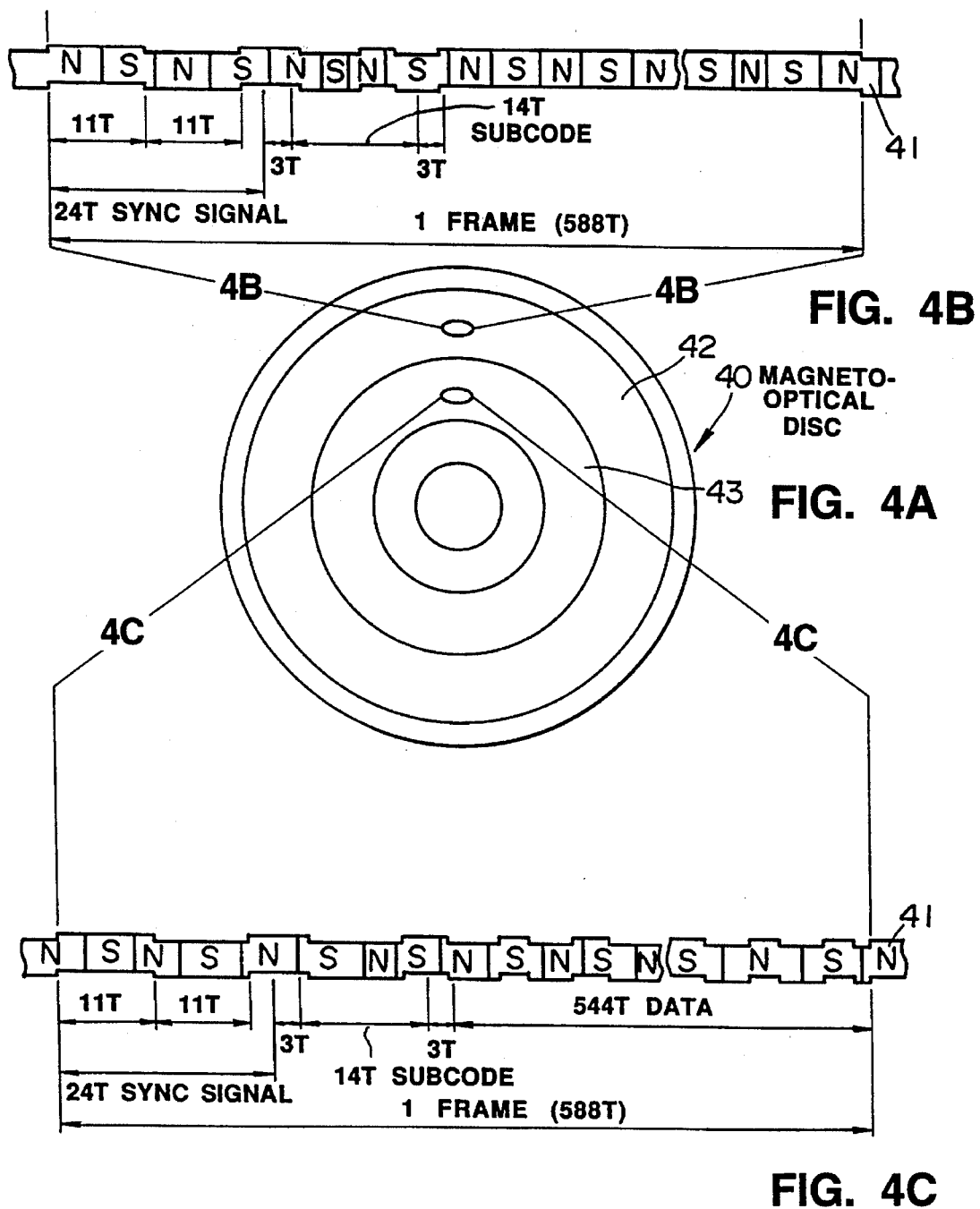
FIG. 4 is a diagrammatic plan view of a magneto-optical disc according to a second embodiment of the optical recording medium of the present invention.

A second embodiment of the optical recording medium according to the present invention will be hereinafter explained by referring to FIG. 4.

In this figure, a magneto-optical disc 40 in which a perpendicular magnetization film exhibiting magneto-optical effects is formed on a transparent substrate, is shown diagrammatically as a second embodiment of the optical recording medium according to the present invention. On this magneto-optical disc 40, a guide groove for tracking is pre-formed spirally or concentrically. The inside of the pre-formed guide groove (pre-groove) or the land between the grooves proves to be the recording track 41, on which the main information is recorded photomagnetically along the track direction. On the recording track 41, the reproduce-only information is recorded by offsetting along the track width (deviation along the track width or modulation along the track width). These information recorded in the form of offsetting along the track width is taken out as the high frequency component of the tracking error signals. It is noted that the frequency of offsetting along the track width is higher than the tracking error signal frequency and hence in no way affects the tracking error signal per se.

Meanwhile, the overall surface of the magneto-optical disc 40 is recordable and the control information consisting of sync signals and clock signal components in the reproduce-only information is recorded on the overall disc surface by the above mentioned offsetting along the track width. Moreover, on a portion of the magneto-optical disc 40, the data per se, such as software program for operating systems, dictionary data, voice data or video data, are pre-recorded by offsetting along the track width and in continuation to the above mentioned control information of each frame. Thus the magneto-optical disc 40 includes a recording region 42 and a region 43 on which reproduce-only data are pre-recorded by offsetting along track width and on which the information (main information) may also be recorded along the track direction. It is noted that reproduce-only data may also be written on the overall region of the magneto-optical disc 40, as on the region 43. The main information recorded photomagnetically for example, along the track width of the recording track 41, may include control data, such as frame sync signals. However, these control data may be omitted, that is, may not be recorded, in consideration that these control data may be obtained from the reproduce-only information recorded by offsetting along the track width.

Figure 5:
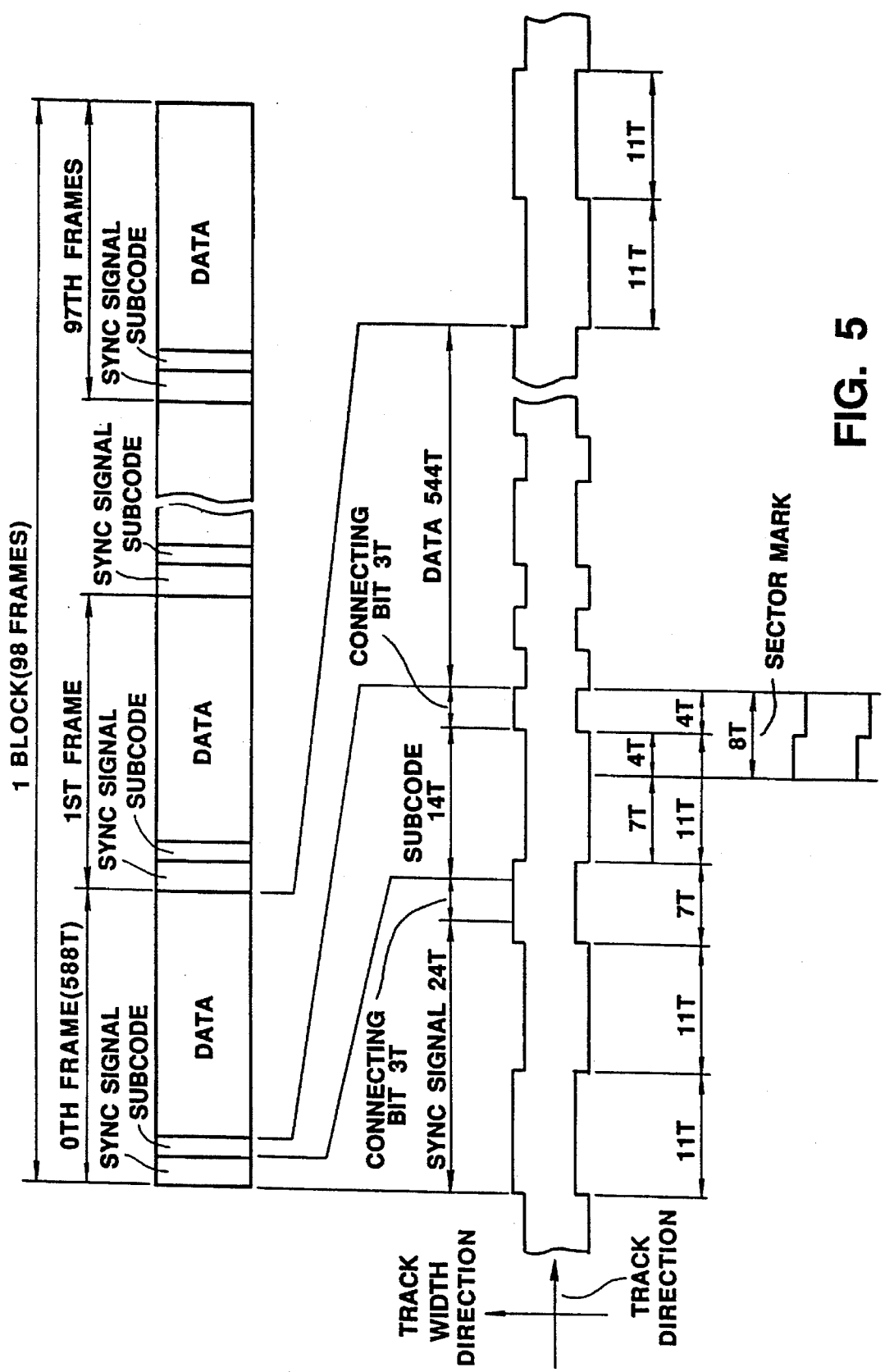
FIG. 5 shows a recording format of a region on the disc adapted to be reproduced exclusively.

A typical example of the recording format for reproduce-only information, recorded by offsetting along the track width, is shown in FIG. 5.

In this figure, the typical example of the information recording format by the offsetting along track width is similar to the format for CD (compact disc). In a general CD format, each block or sector as an information recording unit consists of 98 frames of from the 0th to the 97th frames, each frame being of a period 588 times the channel clock period T, or 588 T. The recording regions for the frame sync signals, subcode and data, inclusive of parity bits, are provided in each frame. 24 T (24 channel bit) frame sync signals and a 14 T subcode region are provided at the leading end of each frame and interconnected by 3T connection bits. In the remaining 544 T region, there are arrayed 32 symbols or 32 bytes of sampled data and parity data modulated by the eight-to-fourteen modulation (EFM) system. The frame sync signals include two successive 11 T transition intervals to provide an out-of rule pattern not found in the EFM system. The 14 T subcode region corresponds to one 8-bit symbol.

As the recorded information by the offsetting along the track width in the concrete example of FIG. 5, 24 T sync signals, inclusive of two successive 11 T transition intervals, similarly to the frame sync signals of the CD format, are consecutive to 3 T connection bits, 14 T subcode data and 3 T connection bits, in this order, to constitute a 44 T frame leading area. The sync signals in the leading portion of the frame are used for frame synchronization. However, for block or sector synchronization, wherein each block or sector is constituted by a number of, herein 98, frames, a predetermined part of the 44 T region, for example, the trailing 8 T region, may be used as a sector mark or a block mark for block synchronization. That is, a deviation pattern along the track width, including a rise at the center of the 8 T interval, is written as the sector mark of the leading frame of a block, whereas a pattern including a fall at the center of the 8 T interval is written as the sector mark of each remaining fame, for distinguishing the leading frame of the block from the remaining frames. As an alternative, similarly to the CD format, patterns $S_0$ and $S_1$ which violate the modulation rule of EFM (out-of-rule patterns) may be written in the subcode regions of the leading and second frames of the block. As regards the pre-modulation 8-bit data (post-modulation 14 channel bit data) of the subcode region, 98 frames may be grouped into one block and, excluding the two frames at the leading end of each block, 8 channels P to W, each consisting of 96 bits, may be constituted, of which the Q channel is used to express the address information for minutes, seconds and frames.

These control data are recorded on the overall region of the magneto-optical disc 40 (discretely at a leading position of each frame) with deviation along the track width. The reproduce-only data per se, such as the above mentioned software program or various data, are recorded in the 544 T data region of the 588 T region of a frame (588 channel bit region) other than the above mentioned 44 T leading area of the frame, for constituting the region 43 of the magneto-optical disc 40. The modulation system for the reproduce-only data recorded by the track offsetting along the track width is the same as, for example, the modulation system for the CD format (EFM), while the recording density of the reproduce-only data is the same as that of the main information on the recording track. In place of the EFM, the PE system or the biphase mark modulation system, for example, may be adapted as the modulation system, while the recording density may be set arbitrarily. The reproduce-only data per se may naturally be recorded by deviation along the track width of the recording track 41 on the overall surface of the magneto-optical disc 40.

When the recording medium on which the reproduce-only information is pre-recorded by the track deviation along the track width is used for recording and/or reproducing the main information on or from the recording track along the track direction, the control information, such as the above mentioned, frame sync signals, obtained from the above mentioned reproduce-only information, may be employed. When recording the main information, since the above mentioned control information need not be recorded newly, the control information may be omitted, that is, sync signals or the like need not be recorded in the leading portion of each frame, as shown in the photomagnetic recording pattern in each recording track 41 in FIG. 4, but only the data per se may be photo-magnetically recorded as the main information along the track direction on the recording track 41. In this manner, the proportion of the data per se in the main information may be increased to enhance the recording capacity of the data per se.

In addition, since the reproduce-only data are pre-recorded (preformatted) by track offsetting along the track width, instead of by tracking control on the overall track conventional pit recording, the recording region may be unified and tracking control switching becomes unnecessary, while the adverse effects of recording of the reproduce-only information by pits on tracking may be prevented and response characteristics or stability of the tracking control operation during track jumping across the regions 42 and 43 may also be improved.

The optical disc or the like medium, in which the reproduce-only information is pre-formatted by the offsetting of the recording track itself along the track width, may be easily mass produced by a press working step using a master disc or a stamper during disc manufacture.

Figure 6:
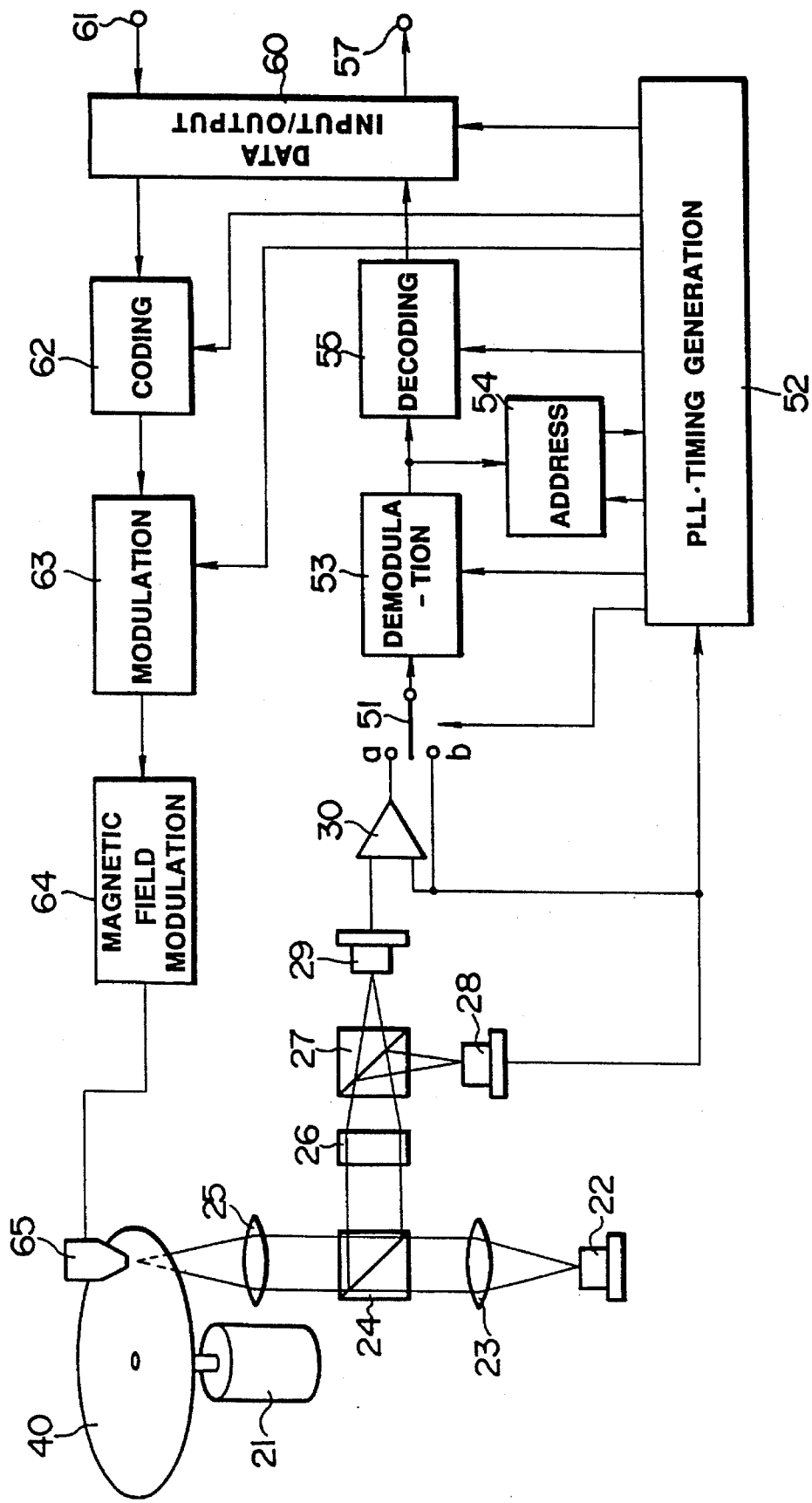
FIG. 6 is a block circuit diagram showing a concrete example of an information recording/reproducing apparatus for recording and/or reproducing the information on or from the magneto-optical disc of FIG. 4.
Figure 7:
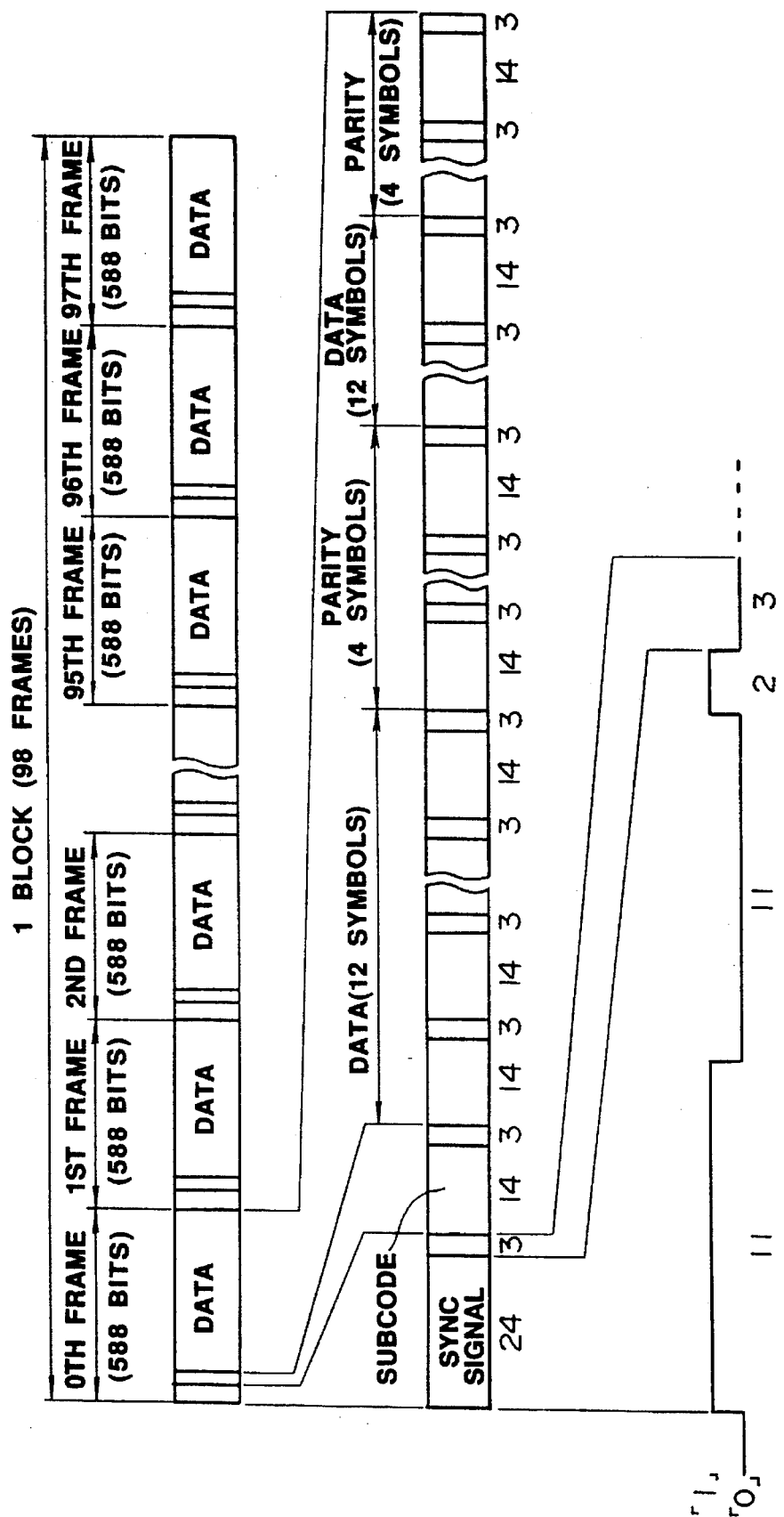
FIG. 7 is a diagrammatic view for illustrating a so-called CD format.

A concrete example of a recording/reproducing apparatus adapted for recording and/or reproducing the information with the use of a magneto-optical disc, which is an optical recording medium in which the recording system (such as the modulation system, error correction system, data formatting system or the address formatting system) for the reproduce-only information recorded by track offsetting along the track width is identified with that for the main information recorded on the recording track along the track direction, is hereinafter explained by referring to FIG. 6.

In this figure, the magneto-optical disc 40 includes the two different regions 42 and 43. A spiral recording track or concentric recording tracks are formed on the disc surface on the whole, and the reproduce-only information is recorded in the ROM region 43 by track offsetting along track width. This magneto-optical disc 40 is driven rotationally at a constant linear velocity (CLV) or at a constant angular velocity (CAV) by a spindle motor 21. Since a laser light source 22, collimator lens 23, beam splitter 24, object lens 25, an optical system 26, such as cylindrical lens, polarization beam splitter 27 and photodetectors 28 and 29 are the same as those shown in FIG. 2, in construction and operation, they are depicted by the same reference numerals and the corresponding description is omitted for simplicity.

The difference between the outputs from photodetectors 28 and 29 shown in FIG. 6 is taken at a differential amplifier 30 for extracting magneto-optically recorded information signals or MO signals. The output from the differential amplifier 30 is transmitted to a fixed terminal a of a changeover switch 51. In photodetector 28, a device having four light receiving segments is used for detecting tracking error signals and focusing error signals, such that reproduce-only information signals recorded by track offsetting along the track width may be obtained from the high frequency component of the tracking error signals. These signals recorded by track offsetting along track width are transmitted to a FETA timing generating circuit 52 for regenerating clock signals and generating various timing signals. The signals recorded by track offsetting are transmitted to a fixed contact b of the changeover switch 51. The output signals from changeover switch 51 are EFM-demodulated at a demodulating circuit 53 and thence supplied to an address decoder 54 and a decoding circuit 55 for decoding error correction codes. The data corrected for error in the decoding circuit 55 are taken out at a data output terminal 57 by means of a data input/output circuit 60.

As described in the foregoing, the changeover switch 61 is controlled in switching depending on whether the data to be reproduced is the reproduce-only information pre-recorded by track offsetting along track width or the main information recorded on the recording track along the track direction, such that the demodulating circuit address decoder and the error correction decoding circuit 55 of a sole series or system may be used for both data types. Thus there is no necessity to provide separate reproducing circuits for the data types and the reproducing circuit scale may be halved. Meanwhile, when the reproduce-only information pre-recorded by track offsetting and the main information recorded on the recording track along the track direction are of the same address format, these two data types may be distinguished from each other by so-called directory or TOC (table of contents) or by addition of identifier data.

It is noted that, if the recording system for the-reproduce-only data pre-recorded by track offsetting, such as the modulation system, error correction system, data formed or the address format, and the recording system for the main information recorded on the recording track along the track direction, are the same as the pre-existing recording system for CDs, for example, various ICs (integrated circuits) or LSIs (large scale integrated circuits) employed in the pre-existing CD reproducing apparatus may be used without any changes or with only little changes for less costly supply and more facilitated designing of the disc reproducing circuit system. Similar effects may be obtained not only when the recording system is the same as that for audio CDs, but also when the recording system is the same as that for so-called CD-ROMs or CDIs.

For data recording, the data of the main information, supplied for recording from a data input terminal 61, are transmitted to a coding circuit 62 for error correction codes by means of a data input/output circuit 60 and thence supplied to a demodulation circuit 63 for, for example, eight-to-fourteen modulation (EFM). The modulated main information is converted into magnetic field modulation driving signals at a magnetic field modulation driving circuit 64 and thence supplied to a magnetic head 65 for photomagnetic recording. During error correction coding at the coding circuit 62 and EFM at the modulating circuit 63, the various processing operations are controlled by clock signals which are phase locked depending on at least the frame sync signals of the reproduce-only information recorded by track offsetting along track width.

The sync signals and the clock signals may be obtained from the reproduce-only information recorded by track offsetting along track width and hence need not be included in the photomagnetically recorded main information. The address information may also be obtained from the reproduce-only information. In this manner, by utilizing sync signals or the like of the reproduce-only information, without recording the sync signals or the like as the main information, the proportion of the data per se in the main information may be increased for increasing the recording capacity of the data per se.

It is seen from above that, with the second embodiment of the present invention, since the reproduce-only information is recorded by track offsetting along track width and the main information may be recorded by utilizing a portion of the reproduce-only information, not only the main information may be recorded on the recording track along the track direction, but also the information may be recorded by track offsetting along track width for increasing the recording capacity of the medium. In addition, due to track offsetting along track width, accessing to unrecorded regions may be made easily during the recording of the main information. During information recording, when the main information is recorded along the track width with the use of a portion of the reproduce-only information recorded by track offsetting along track width, a portion of the reproduce-only information may be used directly as a portion of the main information to omit the recording of the main information to increase further the recording capacity of the medium for the data per se. By identifying the recording system for the reproduce-only information pre-recorded by track offsetting along track width with the recording system for the main information, a sole series circuit system for information recording may be employed. By reproducing the main information by the same reproducing system as that for the reproduce-only information, a sole reproducing circuit may be used and the reproducing circuit itself may be used in common. By recording the reproduce-only information by track offsetting along track width by the same recording system as that for the main information, the reproducing circuit arrangement may be used in common. Besides, by identifying the recording system for the main information and the recording system for the reproduce-only information with the pre-existing recording system for CDs, for example, the pre-existing ISs or LSIs may be employed for facilitating circuit designing or reducing production costs for recording/reproducing apparatus.

It is to be noted that the present invention is not limited to the above described embodiments, but may be applied to phase transition type optical discs, organic dye optical discs, a variety of once-write type discs or overwrite discs, besides the magneto-optical discs, or to cards. Software program data may also be recorded by track offsetting along track width. Various other changes may be made without departing from the scope of the present invention.

What is claimed is:

1. A reproducing apparatus for an optical disc, the optical disc having a recordable area for recording main data, including synchronization signals, on a previously formed recording track along a track length direction, the recording track having at least one offset portion, the offset portion being offset according to control data which is used to control the operation of the apparatus in the radial direction of the optical disc, the apparatus comprising:

a optical pickup including first and second photodetectors, the first photodetector receiving one of two light beams divided from a light beam reflected by the optical disc, the second photodetector receiving the other of the two light beams divided from the reflected light beam;

a differential amplifier supplied with output signals from the first photodetector and the second photodetector and outputting a signal representing the difference between the output signals of the first photodetector and the second photodetector;

a first signal processing unit selectively supplied with one of the output signal from the first photodetector or the output signal from the differential amplifier and including a sync reproducing circuit capable of capturing a sync signal from a detection signal of the offset portion of the recording track from the output signal of the first photodetector and a reproduced synchronization signal included in the main data from the output signal of the differential amplifier; and a second signal processing unit supplied with the output signal from the differential amplifier and including a signal detection circuit for reproducing from the output signal of the differential amplifier main information data recorded along a length direction of the recording track.

2. A reproducing apparatus according to claim 1, wherein the apparatus further comprises a switch circuit controlled by an output signal from the sync reproducing circuit, the switch circuit selecting which of the output from the differential amplifier or the output from the first photodetector is supplied to the first signal processing unit.

3. A recording and/or reproducing apparatus for an optical disc, the optical disc having a recording area and a pre-recorded area provided at a radially inner side of the recording area, the recording area being formed with a guide groove to guide a light beam radiated on the optical disc, with main information data and synchronization signals being recorded along the length of the guide groove, the pre-recorded area including a recording track, the guide groove on the recording track being provided with a plurality of offset portions, each of the offset portions being offset in the radial direction of the optical disc according to synchronization signals and control data which is used to control the operation of the apparatus, the apparatus comprising:

an optical pickup including first and second photodetectors, the first photodetector receiving one of two light beams divided from a light beam reflected by the optical disc, the second photodetector receiving the other light beam divided from the reflected light beam;

a differential amplifier supplied with the output signals from the first and second photodetectors and outputting a difference signal;

a switch circuit controlled by a control signal, the switch circuit selecting either the output signal from the first photodetector or the difference signal output from the differential amplifier according to the control signal and outputting a selected output signal;

a signal processing unit supplied with the selected output signal from the switch circuit and applying a decoding process to the selected output signal to retrieve the synchronization signals from either the output of the first photo detector or the difference signal, and wherein the signal processing unit includes a control circuit supplied with the selected output signal for determining a type of the selected output signal and generating a corresponding control signal for the switch circuit.

4. A recording and/or reproducing apparatus according to claim 3, wherein the apparatus further comprises a recording unit for recording input data on the recording area and applying an encoding process to the input data, the recording unit being controlled by a further output signal from the control circuit.

5. A recording and/or reproducing apparatus according to claim 4, wherein the control circuit generates the further control signal to control the recording unit according to a detection signal of the offset portions.

6. A recording and/or reproducing apparatus according to claim 4, wherein the apparatus further comprises a magnetic head which is supplied with encoded data from the recording unit and generates a vertical magnetic field which is applied to the optical disc.

7. A recording and/or reproducing apparatus according to claim 3, wherein the signal processing circuit includes a series circuit of a demodulation circuit, a decoding circuit and a data input/output circuit and further includes, as the control circuit, a phase-locked-loop timing generating circuit for regenerating clock signals and timing signals, and an address decoder supplied with an output signal from the demodulation circuit, for supplying address information to the phase-locked-loop timing generating circuit.

* * * * *